(12) United States Patent
Newman

(10) Patent No.: US 7,781,905 B2
(45) Date of Patent: Aug. 24, 2010

(54) TURBULENCE REDUCTION AROUND MAGNUS ROTORS

(76) Inventor: Edwin Newman, 2854 Nandina Dr., Palmdale, CA (US) 93550

( * ) Notice: Subject to any disclaimer, the term of this patent is extended or adjusted under 35 U.S.C. 154(b) by 55 days.

(21) Appl. No.: 12/316,303

(22) Filed: Dec. 12, 2008

(65) Prior Publication Data
US 2009/0174192 A1    Jul. 9, 2009

Related U.S. Application Data

(63) Continuation-in-part of application No. 11/985,200, filed on Nov. 13, 2007.

(51) Int. Cl.
*F03D 9/00*    (2006.01)
*F01D 1/36*    (2006.01)
(52) U.S. Cl. .................................................. 290/54
(58) Field of Classification Search ................. 290/43, 290/44, 54, 55, 42, 52, 53
See application file for complete search history.

(56) References Cited

U.S. PATENT DOCUMENTS

| | | | |
|---|---|---|---|
| 1,674,169 A | 6/1928 | Flettner | 416/4 |
| 4,366,386 A * | 12/1982 | Hanson | 290/44 |
| 4,446,379 A * | 5/1984 | Borg et al. | 290/55 |
| 4,582,013 A | 4/1986 | Holland | 114/39.3 |
| 5,131,341 A | 7/1992 | Newman | 114/39.1 |
| 6,602,045 B2 * | 8/2003 | Hickey | 415/1 |
| 7,157,805 B2 | 1/2007 | Mooring | 290/55 |
| 2008/0048455 A1 * | 2/2008 | Carney | 290/54 |
| 2009/0058091 A1 * | 3/2009 | Douglas | 290/53 |

OTHER PUBLICATIONS

U.S Dept. of Energy Grant#DE-FG46-79R610969 R. Holland "The Holland Roller Windmill" (DOE/R6/10969).

* cited by examiner

*Primary Examiner*—Nicholas Ponomarenko

(57) ABSTRACT

A fluid energy conversion system using a Magnus Rotor to generate force and electrical power from passing fluid such as wind. A Magnus Rotor is mounted atop support structure which is far enough away from the surface of the Rotor to minimize fluid turbulence around the peripheral surfaces of the Rotor. The Rotor is mounted on a long horizontal shaft supported by a divided pole on either end. This divided pole is mounted on a pivot so the Magnus Rotor will be faced to the oncoming fluid by a weathervane. Minimizing fluid turbulence can result in greater power production.

3 Claims, 1 Drawing Sheet

TURBULENCE REDUCTION AROUND MAGNUS ROTORS

Figure 1:
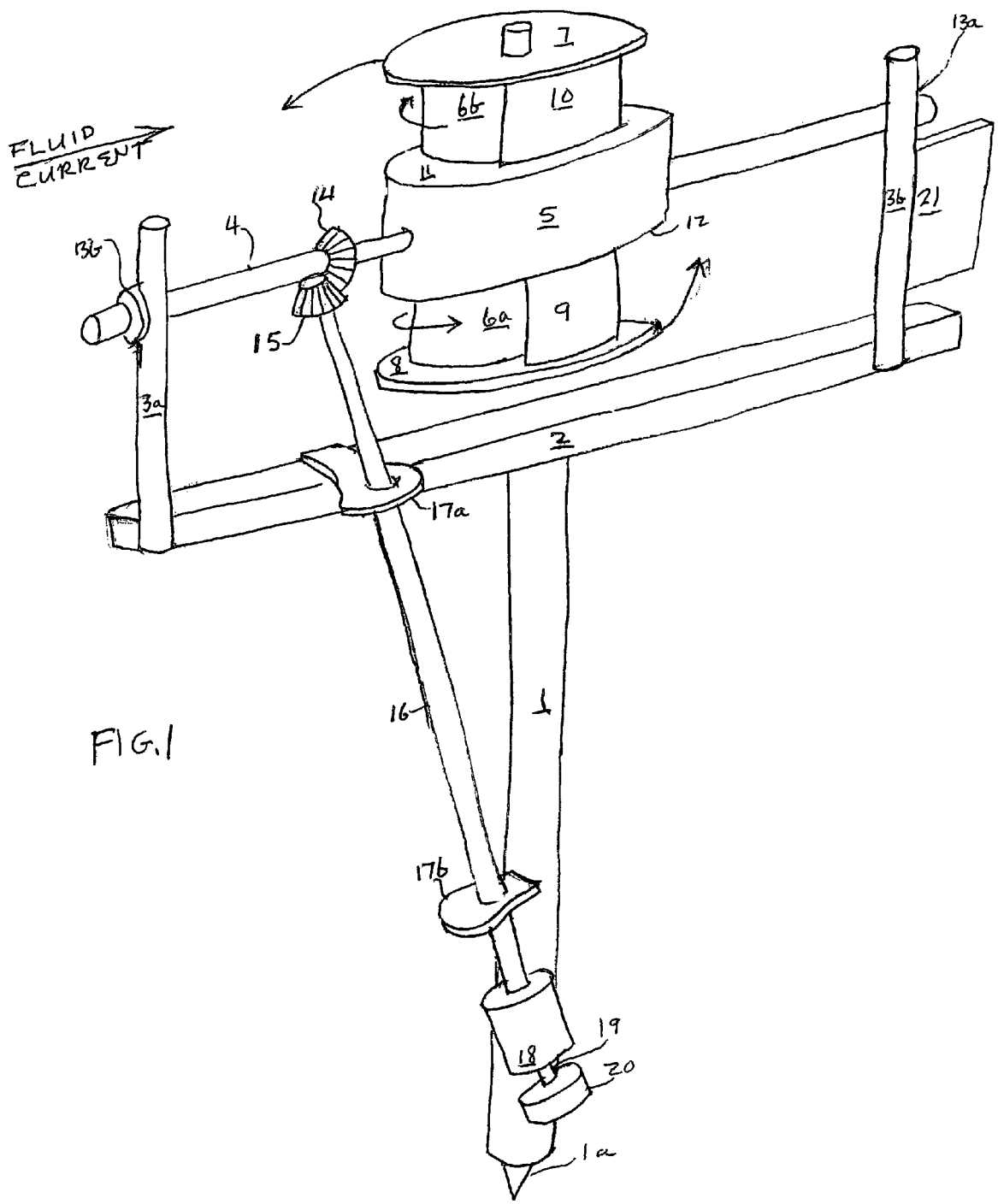

This invention is a Continuation-In-Part of patent application Ser. No. 11/985,200 filed Nov. 13, 2007.

A. BACKGROUND OF THE INVENTION

1. Field of the Invention

This invention relates to fluid energy conversion systems, and more specifically one powered with Magnus Rotors.

2. Description of the Prior Art

Air pressure at the earth's surface is 14.7 lbs./sq. inch. This is about a metric ton/sq. ft. So a cubic foot of air weighs about a metric ton. If this cubic ft. of air is made to move 10 miles/hour the power developed is over 56 horsepower. So theoretically wind energy can supply all man's energy needs. There has been some progress in extracting this energy. In order to do so at 100% efficiency a perfect vacuum must be somehow operatively connected with normal air pressure. Airfoils are used to cause a mild pressure difference which is enough to lift aircraft and, in the form of a propeller, to spin wind turbines to produce electrical energy. But wind turbine efficiency is severely limited since a great deal of the incoming wind energy blows through the propeller arc without affecting performance.

The general problem is to increase as much as possible the coefficient of drag/lift so more power can be produced over the same frontal area of whatever shaped energy collector is placed in the wind stream.

A Magnus Rotor is a spinning cylinder placed so its axis is normal to airflow. If it is spun so the peripheral velocity is the speed of sound then, with no wind, air pressure next to the cylinder drops to zero. Spun in a wind the air is sped up on one side of the cylinder and retarded on the opposite side so the cylinder is drawn towards the vacuum created by the spinning and pushed on the cylinder's opposite side towards the vacuum.

According to Flettner (U.S. Pat. No. 1,674,169) and specifically claims 20-24 and FIGS. 27,28 we see a wind machine with airfoil blades replaced by Magnus Rotors. In the Figures we see the plane of the rotors tilted backwards. This is so a rotor does not come close to the supporting pole as a rotor is made to swing past this supporting pole.

Turning to Hanson (U.S. Pat. No. 4,366,386) we see in FIG. 1 an arrangement where the Magnus Rotors are located so the wind strikes the supporting pole before it strikes the Rotor. These features are for the purpose of reducing the effect of turbulence on the Magnus Rotor.

In Holland (U.S. Pat. No. 4,582,013 which is based on experiments done by Holland under U.S. Dept. of Energy grant FG46-79R610969 issued June, 1981) various conclusions were reached:

1. end plates fixedly attached to the rotor and larger in diameter than the Rotor itself and were spun at the same angular velocity as the Rotor were ineffective in reducing induced drag on the end surfaces of the Rotor. See columns 27,28.

2. Designing a Rotor which is made to spin rapidly and at the same time be made to whirl rapidly around a central hub produces singular drag problems. These and other problems were recognised in the Holland experiments and are addressed in the present invention.

Flettner, Hanson and Holland have their Magnus Rotors' external skin passed close to their supporting poles, cutting down on the possible velocity at which the Magnus Rotor can be revolved. The faster the Rotor is revolved the more power can be developed by their inventions.

It is the principal object of this invention to keep the external skin of a Magnus Rotor as far away from the support structure as is practical to maximize power output of an operatively connected wind energy conversion system.

B. SUMMARY OF THE INVENTION

Magnus Rotors are mounted atop a pole with their driving motors. This pole is divided into two vertical poles. On the upper ends of these two poles a long shaft is suspended between them. This shaft serves as a hub around which are mounted a number of Magnus rotors. A gear mechanism transmits the energy of the rotating shaft to an electric generator. Thus the mass of the supporting structure is eliminated as a source of turbulence around the Magnus Rotors.

The attainment of the foregoing and related objects, advantages and features of the invention should be more readily apparent to those skilled in the art after review of the following more detailed description of the invention, taken together with the drawing in which:

C. BRIEF DESCRIPTION OF THE DRAWING

FIG. 1 is a perspective view of the invention.

D. DETAILED DESCRIPTION OF THE INVENTION

Fixedly attached to pivot 1a is vertical pole 1, Horizontal support 2 is a long square pipe fixedly attached to the top of vertical pole 1. Shaft 4 is supported at the tops of vertical supports 3a,3b by ball bearing mounts 13a,13b. These vertical supports 13a,13b are fixedly attached to either end of horizontal support 2.

Shaft 4 is therefor parallel to support 2. Fixedly attached to shaft 4 are attached Magnus Rotors 6a,6b driven by motors in the manner of prior art. Fixedly attached to vertical support 3b is weathervane 21. Also fixedly attached to shaft 4 are motor housing 5, endplates 7,8,11,12, and rotor tails 9,10 as taught by Holland in the prior art. These attachments to shaft 4 are revolved with shaft 4. Also mounted fixedly on shaft 4 is bevel gear 14. Meshed with bevel gear 14 is a second bevel gear 15. Shaft 16 is operatively attached to bevel gear 15 on one end and on its other end is operatively attached to speed changer 18 which is bolted to vertical pole 1. Brackets 17a,17b restrain horizontal movement of shaft 16, tying shaft 16 to support 2. Speed changer 18 is operatively connected to electric generator 20 by shaft 19.

In operation; as wind blows past Magnus Rotors 6a, 6b and tails 9,10, and as these rotors are spun, shaft 4 is revolved, operating generator 20 through the agency of items 14,15,16, 18 and shaft 19.

Shaft 4 will be long in length so turbulence from air passing poles 3a,3b will have minimal effect on the performance of Magnus Rotors 6a,6b, From the above description it is apparent that the invention achieves the object of the invention. The above embodiment of the invention is provided purely as an example. Many other variations, modifications and applications of the invention may be made. These are considered to be equivalent and within the spirit and scope of the invention.

I claim:

1. A fluid energy conversion system comprising:
   a. at least one magnus rotor means,
   b. a long rod means serving as a hub around which said magnus rotor means may be disposed, said rod means suspended on both ends at the tops of a divided pole means,
   c. an energy transmission means operatively connected to said magnus rotor means, and
   d. an electric generator means operatively connected to said transmission means, said rod means long enough so fluid turbulence around said magnus rotor means will be minimised and so as said magnus rotor means is operated then electrical energy is produced.

2. The system of claim 1 wherein said energy transmission means comprises a speed changer.

3. The system of claim 1 wherein said divided pole means comprises a horizontal support means upon which are fixed two vertical supports on either end of said horizontal support means, said long rod means attached to said vertical supports by ball bearing mounts, and said horizontal support means made to rest fixedly on a pole means.

* * * * *